(12) United States Patent
Sharif et al.

(10) Patent No.: US 6,980,313 B2
(45) Date of Patent: Dec. 27, 2005

(54) FAX-COMPATIBLE INTERNET APPLIANCE

(76) Inventors: Imran Sharif, 554 Valley Way, Milpitas, CA (US) 95035; William Knapp, 10761 Ridgeview Ave., San Jose, CA (US) 95127; Tawhidur Rahman, 11, Mohakhali C/A, (3rd Floor), Dhaka (BD) 1212; Glen Edward Ivey, 27901 Highway 20, Fort Bragg, CA (US) 95437; John Bremsteller, 3020 Country Sq., (Suite # 2126), Carrollton, TX (US) 75006

( * ) Notice: Subject to any disclaimer, the term of this patent is extended or adjusted under 35 U.S.C. 154(b) by 721 days.

(21) Appl. No.: 09/902,985

(22) Filed: Jul. 11, 2001
(Under 37 CFR 1.47)

(65) Prior Publication Data

US 2002/0101620 A1    Aug. 1, 2002

Related U.S. Application Data

(60) Provisional application No. 60/217,627, filed on Jul. 11, 2000.

(51) Int. Cl.$^7$ .......................... G06K 15/00; H04N 1/00; H04N 1/04; H04N 7/173
(52) U.S. Cl. .................... 358/1.15; 358/479; 358/400; 358/1.15; 725/98; 725/117; 725/118
(58) Field of Search ............................. 358/434, 442, 358/444, 468, 407, 400, 401, 443, 479, 471, 358/1.15; 717/174; 707/10; 709/206, 204; 725/87, 93, 98, 106, 117, 118, 147, 148, 153

(56) References Cited

U.S. PATENT DOCUMENTS

| | | |
|---|---|---|
| 4,405,829 A | 9/1983 | Rivest et al. |
| 4,549,279 A | 10/1985 | Lapeyre |
| 4,590,470 A | 5/1986 | Koenig |
| 4,985,863 A | 1/1991 | Fujisawa et al. |
| 5,155,847 A | 10/1992 | Kirouac et al. |
| 5,206,905 A | 4/1993 | Lee et al. |
| 5,298,681 A | 3/1994 | Swift et al. |
| 5,485,622 A | 1/1996 | Yamaki |
| 5,524,195 A | 6/1996 | Clanton, III et al. |
| 5,631,745 A * | 5/1997 | Wong et al. ................. 358/434 |
| 5,708,776 A | 1/1998 | Kikinis |
| 5,761,436 A | 6/1998 | Nielsen |
| 5,809,251 A | 9/1998 | May et al. |
| 5,819,292 A | 10/1998 | Hitz et al. |
| 5,826,015 A | 10/1998 | Schmidt |
| 5,826,269 A * | 10/1998 | Hussey ........................ 707/10 |

(Continued)

FOREIGN PATENT DOCUMENTS

JP    8-161408    *    6/1996    ........... G06F 19/00

(Continued)

*Primary Examiner*—Jerome Grant, II
(74) *Attorney, Agent, or Firm*—Robert Buckley

(57) ABSTRACT

A Fax-compatible Internet appliance includes a network connection section for communication with a network using both data protocols and fax protocols, a video section including a video signal output for outputting video signals to be displayed on a video display, a user interface signal receiver for receiving user interface signals generated by a reduced-keyset user interface device, and a processing unit which controls the network connection section and the video section to generate video signals for displaying received fax messages on the video display. The processing unit provides user interface functions via the video display and user interface signals, the interface functions enabling the user to control transmission, reception and display of fax messages solely through the reduced-keyset user interface unit.

5 Claims, 10 Drawing Sheets

U.S. PATENT DOCUMENTS

| | | | |
|---|---|---|---|
| 5,844,552 A | 12/1998 | Gaughan et al. |
| 5,847,697 A | 12/1998 | Sugimoto |
| 5,874,939 A | 2/1999 | Galvin |
| 5,889,949 A | 3/1999 | Charles |
| D411,534 S | 6/1999 | Lepack et al. |
| 5,909,540 A | 6/1999 | Carter et al. |
| 5,918,229 A | 6/1999 | Davis et al. |
| 5,937,380 A | 8/1999 | Segan |
| 5,940,074 A | 8/1999 | Britt, Jr. et al. |
| 5,960,411 A | 9/1999 | Hartman et al. |
| 5,983,227 A | 11/1999 | Nazem et al. |
| 5,983,262 A | 11/1999 | Kukkal |
| 5,987,506 A | 11/1999 | Carter et al. |
| 5,987,621 A | 11/1999 | Duso et al. |
| 5,995,540 A | 11/1999 | Draganic |
| 5,995,943 A | 11/1999 | Bull et al. |
| 6,005,476 A | 12/1999 | Valiulis |
| 6,005,563 A | 12/1999 | White et al. |
| 6,006,034 A | 12/1999 | Heath et al. |
| 6,009,524 A | 12/1999 | Olarig et al. |
| 6,011,554 A | 1/2000 | King et al. |
| 6,018,345 A | 1/2000 | Berstis |
| 6,021,399 A | 2/2000 | Demers et al. |
| 6,021,418 A | 2/2000 | Brandt et al. |
| 6,026,474 A | 2/2000 | Carter et al. |
| 6,028,679 A * | 2/2000 | Murphy .................. 358/407 |
| 6,029,175 A | 2/2000 | Chow et al. |
| 6,038,570 A | 3/2000 | Hitz et al. |
| 6,041,346 A | 3/2000 | Chen et al. |
| 6,049,835 A | 4/2000 | Gagnon |
| 6,052,367 A | 4/2000 | Bowater et al. |
| 6,052,696 A | 4/2000 | Euler et al. |
| 6,052,725 A | 4/2000 | McCann et al. |
| 6,055,566 A | 4/2000 | Kikinis |
| 6,061,659 A | 5/2000 | Murray |
| 6,061,668 A | 5/2000 | Sharrow |
| 6,061,740 A | 5/2000 | Ferguson et al. |
| 6,064,449 A | 5/2000 | White et al. |
| 6,065,043 A | 5/2000 | Domenikos et al. |
| 6,065,049 A | 5/2000 | Beser et al. |
| 6,065,061 A | 5/2000 | Blahut et al. |
| 6,067,098 A | 5/2000 | Dye |
| 6,067,582 A | 5/2000 | Smith et al. |
| 6,069,310 A | 5/2000 | James |
| 6,070,174 A | 5/2000 | Starek et al. |
| 6,070,191 A | 5/2000 | Narendran et al. |
| 6,072,861 A | 6/2000 | Yu |
| 6,073,168 A | 6/2000 | Mighdoll et al. |
| 6,073,171 A | 6/2000 | Gaughan et al. |
| 6,073,177 A | 6/2000 | Hebel et al. |
| 6,073,214 A | 6/2000 | Fawcett |
| 6,074,434 A | 6/2000 | Cole et al. |
| 6,075,568 A | 6/2000 | Matsuura |
| 6,076,168 A | 6/2000 | Fiveash et al. |
| 6,076,734 A | 6/2000 | Dougherty et al. |
| 6,078,757 A | 6/2000 | Saito et al. |
| 6,078,886 A | 6/2000 | Dragosh et al. |
| 6,078,929 A | 6/2000 | Rao |
| 6,078,954 A | 6/2000 | Lakey et al. |
| 6,078,961 A | 6/2000 | Mourad et al. |
| 6,080,207 A | 6/2000 | Kroening et al. |
| 6,081,835 A | 6/2000 | Antcliff et al. |
| 6,081,837 A | 6/2000 | Stedman et al. |
| 6,084,859 A | 7/2000 | Ratcliff et al. |
| 6,085,126 A | 7/2000 | Mellgren, III et al. |
| 6,085,171 A | 7/2000 | Leonard |
| 6,085,195 A | 7/2000 | Hoyt et al. |
| 6,085,321 A | 7/2000 | Gibbs et al. |
| 6,088,544 A | 7/2000 | Saito et al. |
| 6,092,078 A | 7/2000 | Adolfsson |
| 6,094,277 A | 7/2000 | Toyoda |
| 6,096,096 A | 8/2000 | Murphy et al. |
| 6,097,383 A | 8/2000 | Gaughan et al. |
| 6,098,056 A | 8/2000 | Rusnak et al. |
| 6,098,089 A | 8/2000 | O'Connor et al. |
| 6,101,472 A | 8/2000 | Giangarra et al. |
| 6,101,473 A | 8/2000 | Scott et al. |
| 6,101,548 A | 8/2000 | Okada |
| 6,104,373 A | 8/2000 | Klein |
| 6,108,629 A | 8/2000 | Kasday |
| 6,108,637 A | 8/2000 | Blumenau |
| 6,108,703 A | 8/2000 | Leighton et al. |
| 6,112,176 A | 8/2000 | Goldenthal et al. |
| 6,115,030 A | 9/2000 | Berstis et al. |
| 6,118,230 A | 9/2000 | Fleischmann |
| 6,119,088 A | 9/2000 | Ciluffo |
| 6,119,155 A | 9/2000 | Rossmann et al. |
| 6,119,244 A | 9/2000 | Schoenthal et al. |
| 6,199,204 B1 | 3/2001 | Donohue |
| 6,779,019 B1 * | 8/2004 | Mousseau et al. .......... 709/206 |
| 6,779,178 B1 * | 8/2004 | Lloyd et al. ................. 717/174 |
| 6,889,246 B1 * | 5/2005 | Kawamoto et al. ......... 709/204 |
| 2001/0056579 A1 * | 12/2001 | Kogane et al. ............. 725/105 |
| 2002/0138827 A1 * | 9/2002 | Yoshimine et al. ............ 725/1 |
| 2002/0138843 A1 * | 9/2002 | Samaan et al. ............... 725/87 |
| 2002/0162122 A1 * | 10/2002 | Birks et al. ................. 725/136 |
| 2004/0068746 A1 * | 4/2004 | Mori et al. .................... 725/88 |
| 2004/0103444 A1 * | 5/2004 | Weinberg et al. ........... 725/132 |
| 2005/0015719 A1 * | 1/2005 | Marchon et al. ............ 715/513 |
| 2005/0034166 A1 * | 2/2005 | Kim et al. ................... 725/119 |
| 2005/0120369 A1 * | 6/2005 | Matz ............................ 725/40 |

FOREIGN PATENT DOCUMENTS

| | | | | |
|---|---|---|---|---|
| JP | 2004-312084 | * | 11/2004 | .......... H04N 7/173 |

* cited by examiner

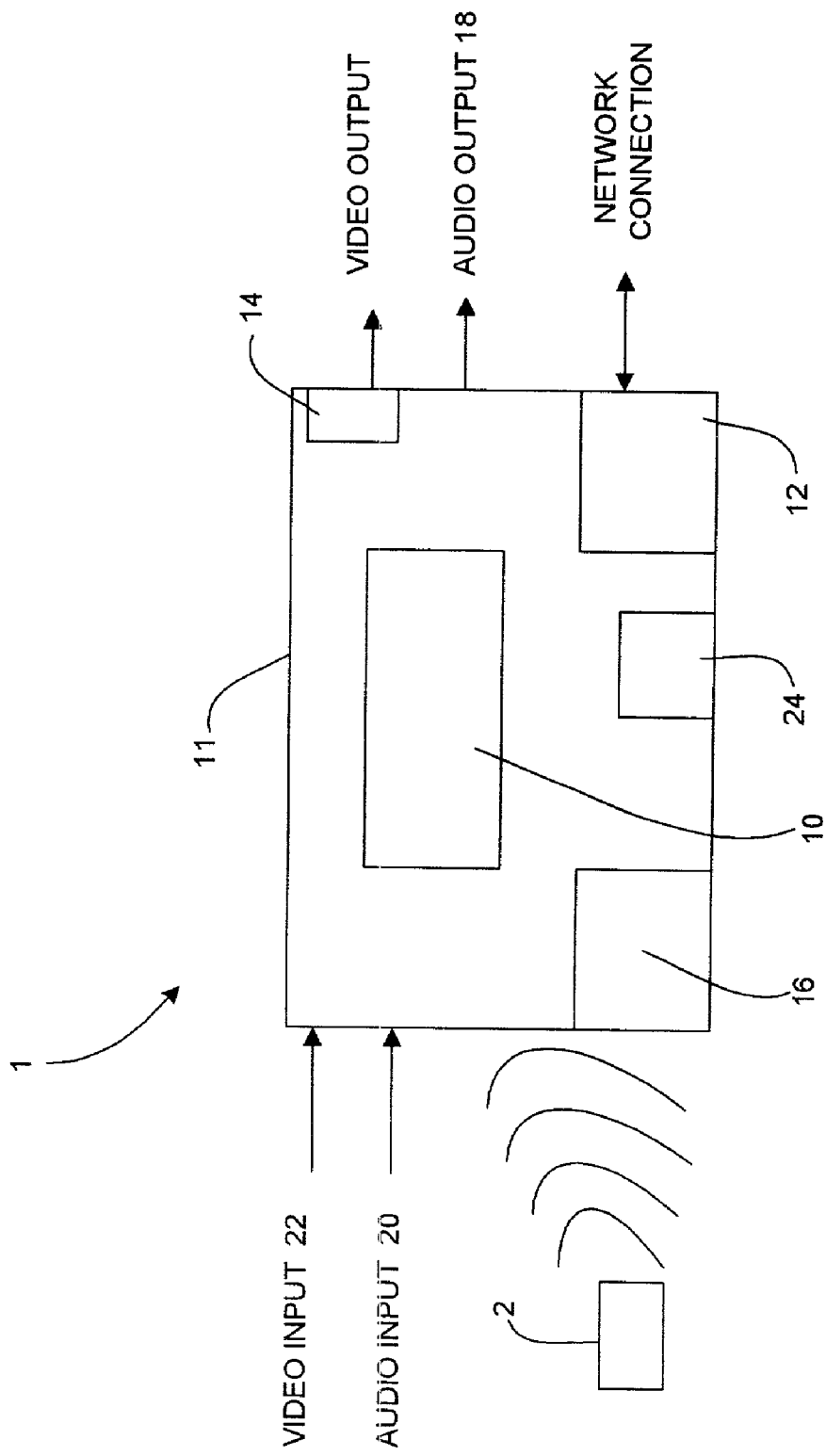

FAX-COMPATIBLE INTERNET APPLIANCE

CLAIM FOR PRIORITY

Priority is hereby claimed from Provisional Patent Application Ser. No. 60/217,627, filed Jul. 11, 2000, for "Fax-Compatible Internet Appliance".

FIELD OF THE INVENTION

This invention relates to an Internet appliance, and in particular, to a fax-compatible Internet appliance.

BACKGROUND OF THE INVENTION

Facsimile (fax) machines are used to transmit images of printed documents from one place to another. Typical fax machines are capable of both sending and receiving transmissions. Fax machines use bi-directional digital communication signals, represented as audio tones transmitted across standard telephone lines. Fax transmission techniques are in the same general family as modem (modulator/demodulator) data communication used by computers and data processing systems, and it is possible for the modem of a computer system to support data communication between the computer and a fax machine, in addition to computer-to-computer data communication. The standards that govern interoperation of fax systems are set and governed by the CCITT.

Typically, a fax transmission is point-to-point, as is illustrated in FIG. 1. One fax machine (the transmitter) places a standard telephone call to the telephone line assigned to a second fax machine (the receiver). If the receiver's telephone line is shared with a voice phone or other functions, then one of a variety of methods is used to answer the call and determine that it is a fax transmission and should be directed to the receiver fax machine, as opposed to a voice or other data call. Once the call is answered by the receiver, the receiver and transmitter enter into a "negotiation" to determine the maximum data transmission rate supported by the transmitter, the receiver, and the intervening telephone line, as well as the usage of other features and protocols that the systems may optionally support. After the connection is completely established, the transmitter sends the data representing the contents of each page of the fax transmission to the receiver, where the data may be temporarily buffered and is printed. The transmitter and receiver have an ongoing handshake protocol to prevent the data buffers of the receiver from overflowing, which may happen if the receiver cannot print the pages received as quickly as the data defining them arrives.

As illustrated in FIG. 2, a conventional fax device 200 includes a controller/sequencer 201, a scanner subsystem 202, a paper intake transport mechanism 203, a printer subsystem 204, a blank paper transport mechanism 205, front panel controls 206, and a telephone communication subsystem 207. The controller/sequencer 201 is typically an embedded microprocessor system, and implements the communication protocols and generally controls the fax system device 200. It also contains a memory buffer subsystem 208 in which data is stored prior to transmit or after receipt. The scanner subsystem 202 is typically an optical scanner that "reads" the surface of the page(s) to be transmitted and creates an equivalent digital bitmap image. The paper intake transport mechanism 203 is a mechanical system for taking in the page(s) to be transmitted, passing them through the scanner subsystem, and placing them in an outfeed tray. The printer subsystem 204 is a printer, such as a thermal or ink jet printer or other digital print device that creates hard copy documents based on the page image data received. The blank paper transport mechanism 205 is a mechanical system for taking blank paper from a reservoir, passing them through the printer subsystem, and placing them in an outfeed tray. The front panel controls 206 is a user interface to the fax system, typically including an array of buttons or keys and a display such as a liquid-crystal or electroluminescent display. The telephone communication subsystem (telephone line interface 207) serves as an interface between the fax machine to the telephone line and other fax machines. The constituent components of the conventional fax device 200, such as the scanner, printer, and controller, are also capable of being configured as a copy machine. Documents to be copied may be scanned as if they are to be faxed, and the scanner data is instead printed out to make a copy of the original document.

In addition to the basic fax machine shown in FIG. 2, many existing systems integrate fax capability with other functions. For example, there are so-called "multi-function" or "all-in-one" systems that take advantage of the fact that a fax machine contains printer and scanner subsystems. A multi-function fax has an interface to a computer, and serves as a printer and/or scanner for the computer as well as operating as a stand-alone device or a fax machine remotely controlled from the computer. Other fax machines integrate the functions of a telephone and/or a telephone answering machine, sharing their telephone line connection between these functions and the fax function. This can be advantageous as it is difficult for an answering machine and a fax machine to share a telephone line if they are not integrated. Finally, a large number of modems for computers, virtually all modern "internal" modems, also have the ability to support the fax data modulation schemes and communication protocols. Typically, the software for these modems allows fax "pages" to be transmitted directly from the software applications of the computer in lieu of printing actual paper pages and then feeding them through a separate fax machine, and can receive fax data which is then displayed to the screen and/or printed on the printer(s) connected to the computer. In all of these cases, the quality that fundamentally makes a device a "fax machine" is its ability to communicate using the standard fax protocols, rather than particular physical components like the paper transport mechanisms, internal scanner or printer.

SUMMARY OF THE INVENTION

An object of the present invention is to provide a facsimile device that provides paperless operations.

Another object of the present invention is to provide a facsimile device that utilizes the capabilities of a network server to store and archive data.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an Internet appliance for transmitting and receiving fax messages. The Internet appliance includes a network connection section for communication with a network using both data protocols and fax protocols, a video section including a video signal output for outputting video signals to be displayed on a video display, a user interface signal receiver for receiving user interface signals generated by a reduced-keyset user interface device, and a processing unit which controls the network connection section and the video section to generate video signals for displaying received fax messages on the video display. The processing unit provides user interface functions via the video display and user interface signals, the interface functions enabling the user to control transmission, reception and display of fax messages solely through the reduced-keyset user interface unit.

It is to be understood that both the foregoing general description and the following detailed description are exemplary and explanatory and are intended to provide further explanation of the invention as claimed.

BRIEF DESCRIPTION OF THE DRAWINGS

FIGS. 3(a) and 3(b) illustrate an Internet appliance according to embodiments of the present invention.

DESCRIPTION OF THE PREFERRED EMBODIMENTS

Internet access devices typically refer to devices that have limited computing and storage capabilities and are typically connected to a network such as the Internet to utilize the capabilities of other devices on the network. An "Internet appliance" (IA) according to embodiments of the present invention is a device that is capable of providing full functionalities of an Internet access device but has a compact structure and a simple user input device having a simple keypad with a limited set of numeric and function keys. Thus, although most functions performed by the Internet appliance can be performed by a PC, other types of Internet access devices or a system of a plurality of networked devices, the uniqueness of the Internet appliance lies in its simple and compact structure, and its ability to provide user interface using a simpler user input device than a text-entry keyboard and a mouse required for a PC. In particular, an Internet appliance that works with a reduced-keyset user interface device with a minimum set of keys for user interface provides simplicity of operation and over-all ease of use.

Figure 1:
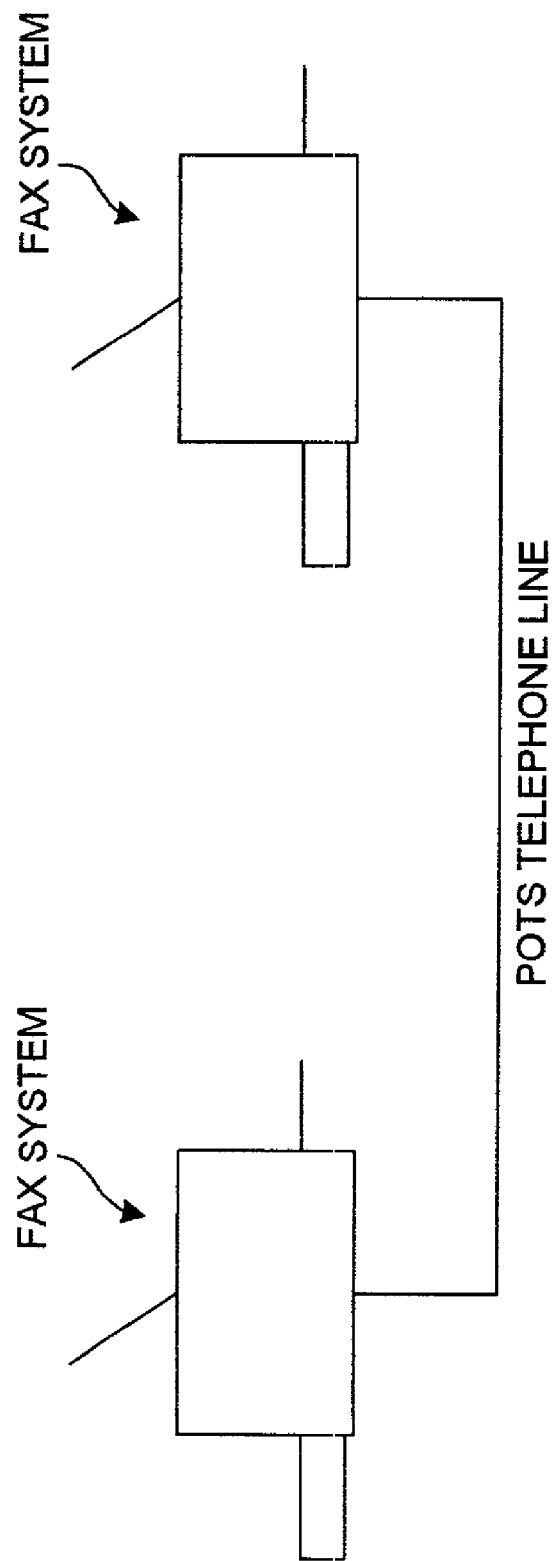
FIG. 1 illustrates a conventional fax transmission configuration.
Figure 2:
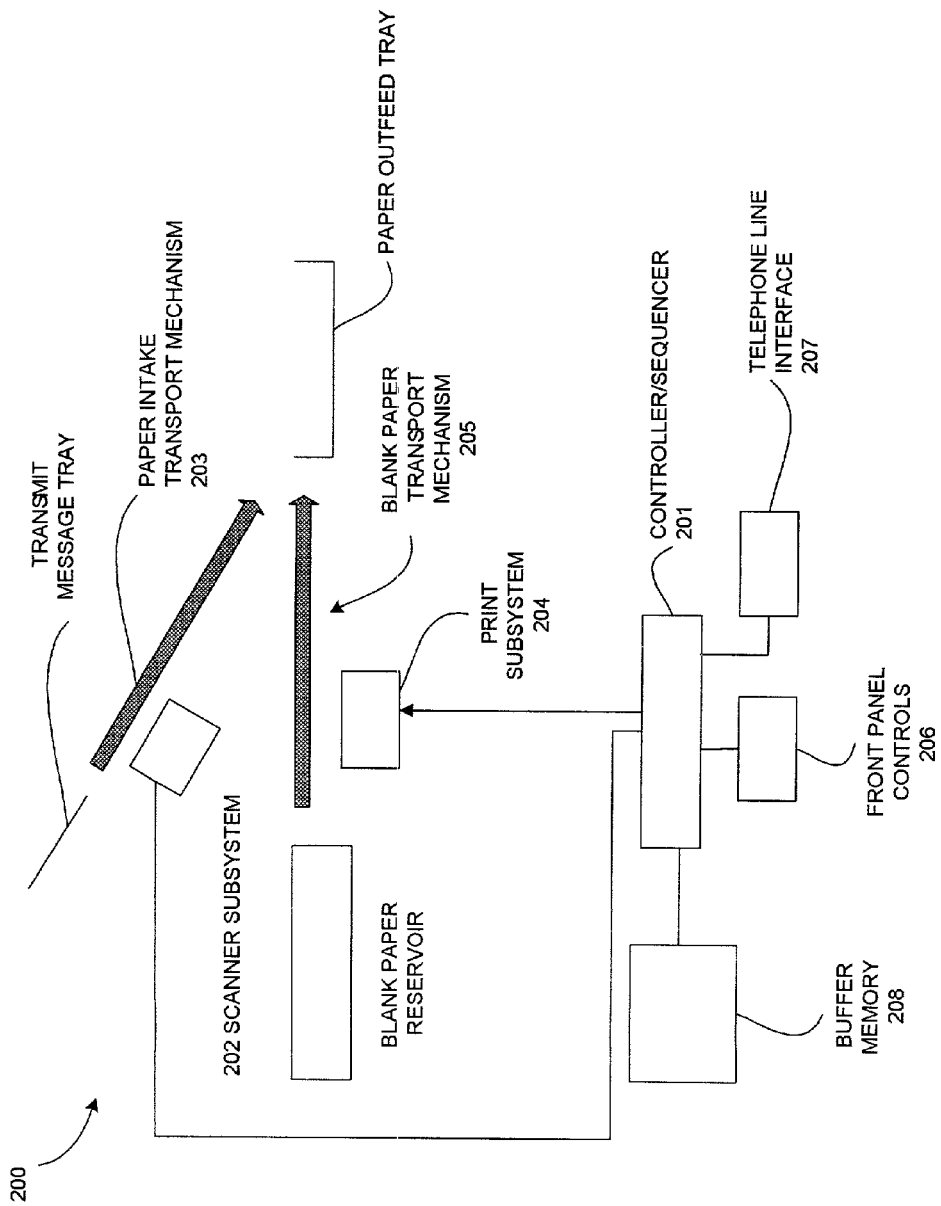
FIG. 2 illustrates a conventional fax system.
Figure 3A:
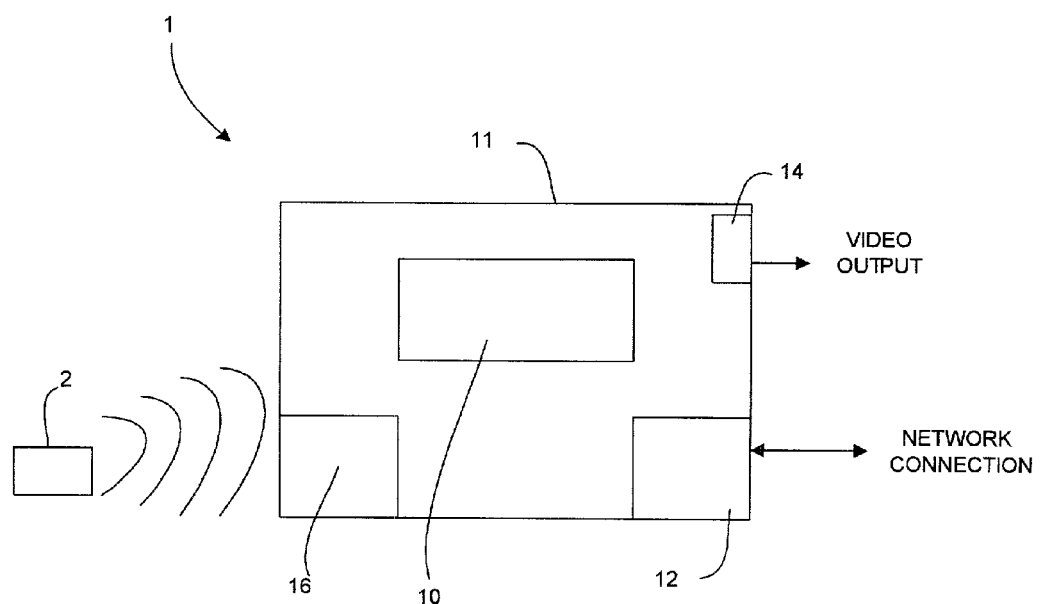

Referring to FIG. 3(a), an Internet appliance 1 according to an embodiment of the present invention is a small device that includes a processing unit 10; a wired or wireless network connection section 12 such as a modem for communication with a network; a video section 14 including a video signal output, such as a television interface for outputting video and audio signals, or separate video and audio signal outputs; and a user interface signal receiver 16 for receiving user interface signals from a reduced-keyset user interface device 2, such as a consumer-type remote control unit. The above components are preferably contained in a housing 11 or provided on the outside surface of the housing to form an integral unit. The processing unit 10 is connected to the network connection section 12, the video section 14 and user interface signal receiver 16 and controls all functions of the Internet appliance 1. The reduced-keyset user interface device 2 is a device that has a small number of keys and transmits a small number of keystroke signals associated with the keys. As used in this specification, the term "reduced-keyset user interface device" does not include a device that has a full text-entry keyboard. The video section 14 can be connected to a display such as a television for displaying information, and the Internet appliance unit 1 typically does not have its own video display or other graphic display devices in the interest of reducing the device size. The user interface signal receiver 16 is the only device for receiving user interface information from the user (via the reduced-keyset user interface device 2), and the Internet appliance unit does not have its own keyboard input device with text-entry keys. The lack of an integral video display device and a keyboard allows the Internet appliance to have a compact structure. User interface is provided solely through the cooperation with video display and the reduced-keyset user interface device 2.

As shown in FIG. 3(b), several features may be added to most Internet appliances, although not required, including: an audio output 18, an audio input 20, a video input 22, and visual indicators 24. These features may be actual input and output devices such as a speaker, a microphone, and a video camera that are housed in the housing 11, if they can be made sufficiently compact. Alternatively, they may be input and output signal terminals provided on the housing 11 for connecting with external devices such as speakers, microphones and video cameras. The audio and video inputs are used to capture and store voice and image information from the user. The audio output 18 may be used to produce a user-feedback sound such as a beep or click each time a user key press on the user interface device is received and processed. If a key press is received but ignored because it is currently invalid, the UI remains silent or make a different (error) sound. The visual indicators 24, such as an LED panel, are typically provided on the housing 11 for providing the user with visual indications of system statuses. All of the individual components of the Internet appliances described above are known in the art and/or commercially available.

The Internet appliance according to embodiments of the present invention cooperates with a reduced-keyset user interface device to accomplish all user interface functions. As used in this specification, the term "reduced-keyset user interface device" refers to an input device having a small number of numeric, direction (arrow) and function keys that generates a small set of keystroke signals. The term reduced-keyset user interface device does not include a device that has a full text-entry keyboard. In this specification, the description "a small number of keys" is understood to mean a set of ten numeric keys, a set of four direction keys, and a limited number (such as 3–5) of function keys. An example of a reduced-keyset user interface device is a consumer-style remote control unit (RCU). Another example is the keypad of a cellular phone. In other words, cellular phones, which has infrared and/or radio frequency transmitters and receivers, may be used to interact with an Internet appliance.

Figure 4:
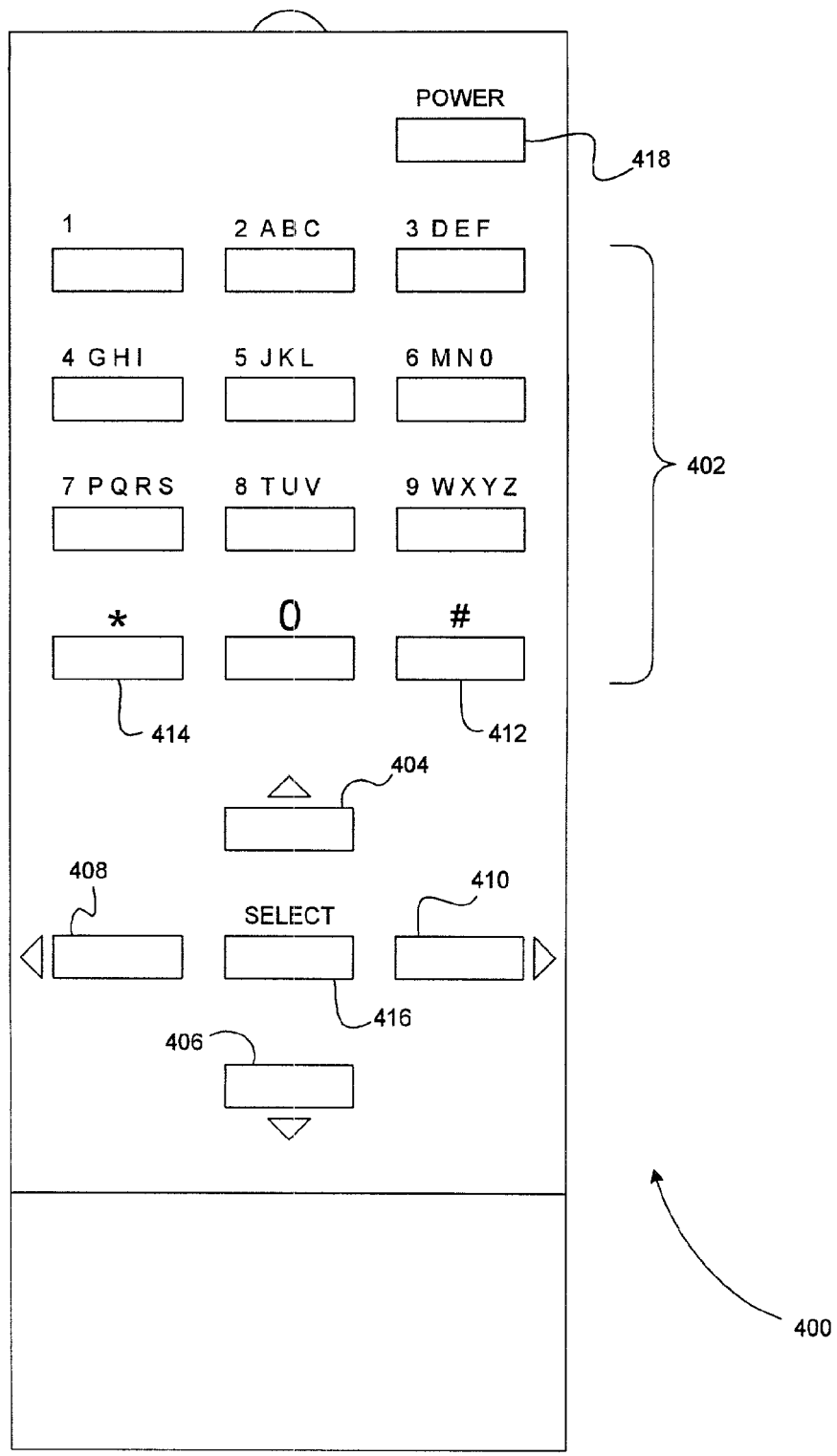
FIG. 4 shows the keypad layout of a reduced-keyset user interface device useful as a user interface device for an Internet appliance.

FIG. 4 illustrates a layout of a typical reduced-keyset user interface device 400, which includes a set of ten numeric keys 402, four arrow or direction keys (Up 404, Down 406, Left 408, and Right 410), a Pound key ("#") 412, a Star key ("*") 414, a Select key 416, and an On/Off toggle key 418. Alternatively, the four arrow keys may be replaced by a "joybutton" type of device (input device that has single switches in the cardinal locations instead of multi-value analog sensors). This preferred layout (400, generally) of 18 keys is optimized for ease of use and operation. This key set has the additional advantage that it is very similar to the keypad found on cordless telephone handsets (such as the Star and Pound keys). Of course, the keys on the user interface device, especially the function keys such as the Pound, Star and Select keys, may be labeled differently without affecting the basic function of the user interface device. In addition, more or fewer keys may be used, and auxiliary keys such as shift, control or alt keys may be provided to expand the number of keystroke signals. A keystroke input device satisfies the requirement of a reduced-keyset user interface device according to the present invention so long as it has relatively few function keys and does not have a full set of text-entry keys. Further, depending on application, the reduced-keyset user interface device may be a wireless or wired device, or integrally provided on the housing of the Internet appliance. For example, for a fax-compatible appliance to be used in shared environments (like an office), it may be preferable to provide the user input keypad directly on the housing of the appliance, rather than having a separate "remote control" type input device. This minimizes the risk that the user input device is separated from the appliance and lost.

A graphical user interface (GUI) that enables a user to interact fully with an Internet appliance using a reduced-keyset user interface device is described in commonly assigned, co-pending patent application entitled "Internet Appliance Using a Reduced-Keyset User Interface Device", (re-titled "Internet Appliance for Interactive Audio Visual Display Using A Remote Control Unit for User Input", Application Ser. No. 09/903,326, filed Jul. 11, 2001, under obligation of assignment to UNIQA, Inc., claiming benefit of priority from U.S. Provisional Patent Application, Ser. No. 60/217,626, filed Jul. 11, 2000) which is incorporated herein by reference in its entirety.

An Internet appliance has a network connection section and is preferably connected to a network. A networked Internet appliance may be referred to as a "client device", and information may be processed by a multitude of servers on the Internet. The local client device has information processing capabilities, but it typically requires resources on the Internet to accomplish a large part of its functions. An Internet appliance, however, is typically able to perform certain information processing functions even when the network connection is inactive. The term Internet appliance is not intended to be limited to devices having any particular network connection configuration, and includes devices that are stand-alone for at least a part of the time.

Figure 5:
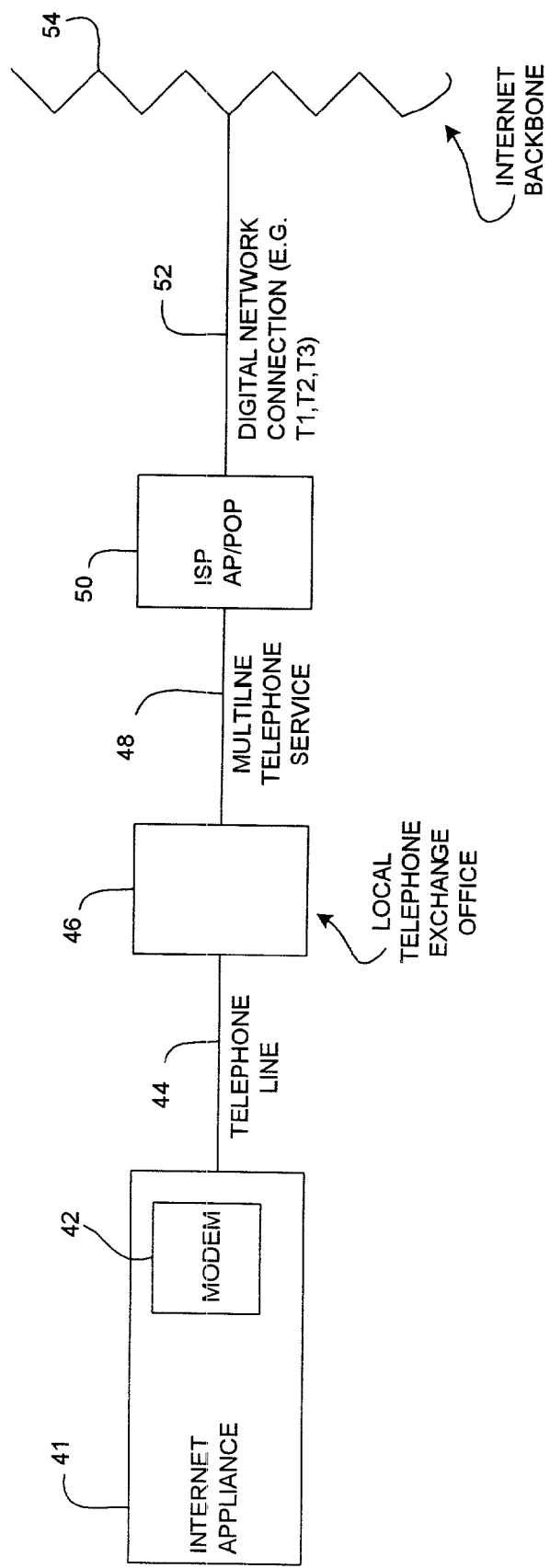
FIG. 5 illustrates a network connection topology for an Internet appliance using a modem.

A typical network connection is to the Internet, but other types of network may also be used, such as an Intranet. For internet appliances that connect to the network using a modem, an Internet Service Provider (ISP) is typically employed to provide the hardware and software infrastructure that provides the link between the modem in the appliance and the other systems on the network to which it connects. FIG. 5 illustrates an Internet appliance connection topology using a modem 42. In the illustrated embodiment, the Internet appliance 41 is connected to a local telephone exchange office 46 via a telephone line 44. An ISP AP/POP (Access Point/Point of Presence) 50 is connected to the local telephone exchange office 46 via a multiline telephone service 48 and to the internet backbone 54 via a digital network connection 52 such as T1, T3 or T5 lines. An Internet appliance network connection shown in FIG. 5 using a telephone modem is suitable for appliances that interoperate with fax systems, but the category of Internet appliance devices are not limited to those employing a modem for their network connection. Any network connection technology, wired or wireless, may be employed by an Internet appliance.

Figure 6:
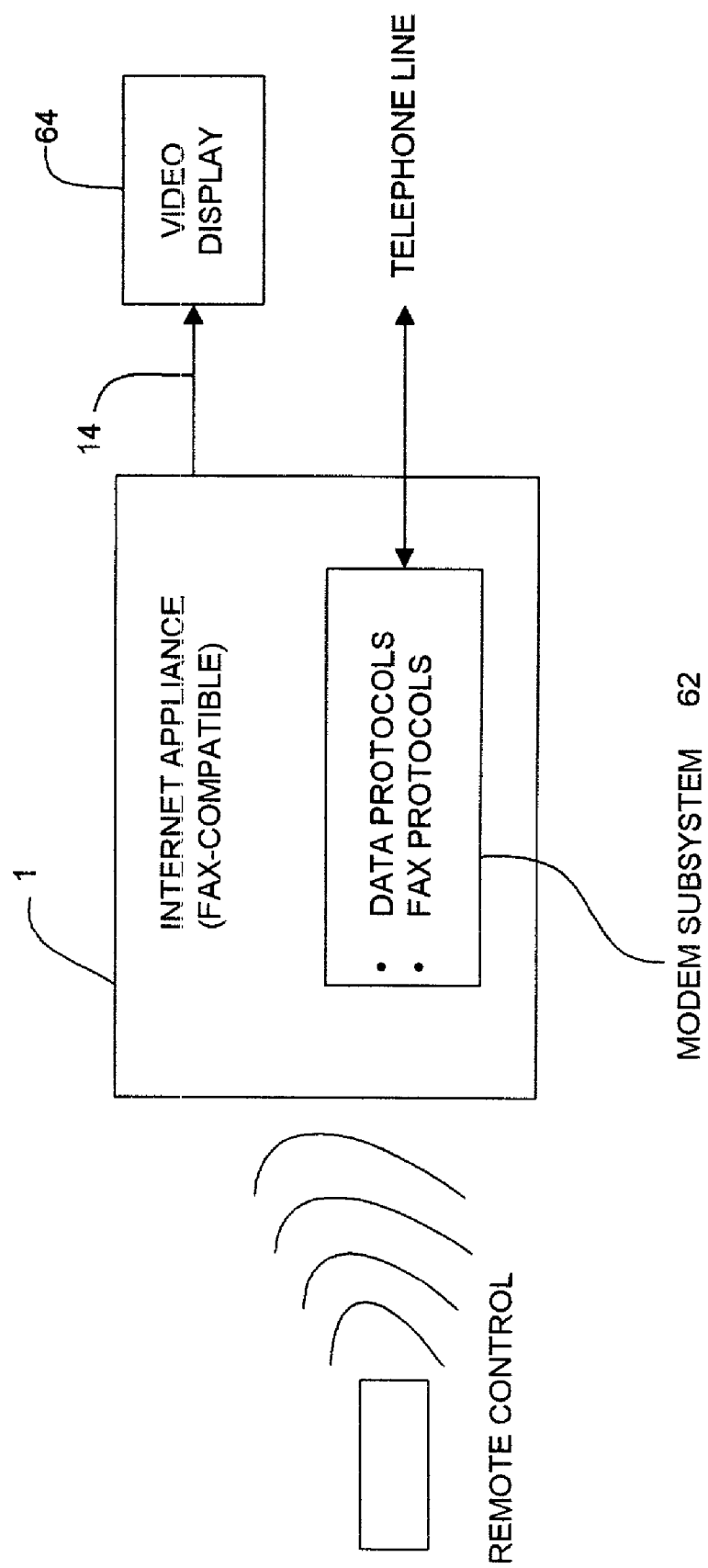
FIG. 6 illustrates the structure of a fax-compatible Internet appliance according to an embodiment of the present invention.

A fax-compatible Internet appliance is an Internet appliance as described and shown in FIG. 3(a), with additional components that allow it to inter-operate with other fax messaging systems. Here, the term "fax messaging systems" includes any system that is capable to communicate using fax protocols, including fax machines, fax-capable computers, and other fax-compatible Internet appliances. Referring to FIG. 6, a fax-compatible Internet appliance 1 (hereafter referred to as "fax/appliance") is provided with a network connection section (modem subsystem 62) and is capable of communicating using both data (computer) modem protocols and standard fax protocols (referred to as a fax interface). Examples of a fax interface includes a fax modem, an interface IC having fax capabilities, etc.

When using the fax/appliance 1, a video output signal 14 is connected to a video display 64 such as a TV set (not a part of the fax/appliance). Incoming fax messages are viewed using the video display 64 without requiring a printer for printing a hardcopy.

Thus, the fax/appliance 1 provides an entirely paperless operation. This prevents any failure to receive a message due to a "paper out" or "paper jam" condition. Outgoing fax messages are composed using any data input or data capture and storage mechanisms available on the appliance. For example, when the fax-compatible appliance 1 is also provided with a web browser application, an image or block of text downloaded from the network may be transmitted as a fax message. An example of a web browser application running on an Internet appliance is disclosed in commonly-assigned, co-pending patent application entitled "Web Browser Implemented in an Internet Appliance" filed Jul. 11, 2001, application Ser. No. 09/902,986 (formerly U.S. Provisional Patent Application, Ser. No. 60/217,628, filed Jul. 11, 2000).

Figure 7:
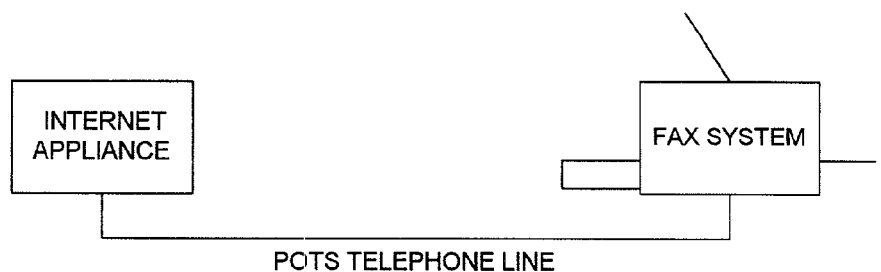
FIG. 7 illustrates a fax-compatible Internet appliance communicating with another fax system using a point-to-point topology.
Figure 8:
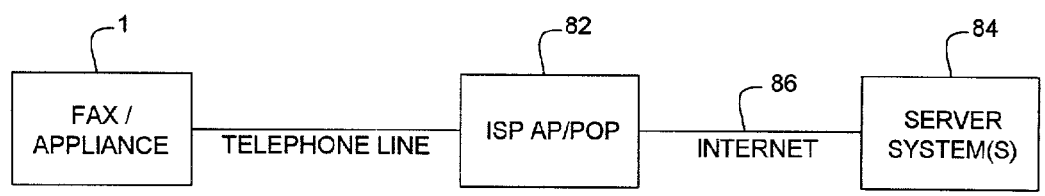
FIG. 8 illustrates a fax-compatible Internet appliance connected via a network to a server system.

In addition to a conventional point-to-point connection configuration used by conventional fax systems (see FIG. 7), the fax/appliance may be connected to a network and take advantage of network servers to provide additional features to the user. FIG. 8 shows a communication topology in which the fax/appliance 1 is connected via an ISP AP/POP 82 to servers 84 on the Internet 86. Using such a communication topology, the fax/appliance may use the remote servers 84 to store data on behalf of the fax/appliance 1. This allows the fax/appliance 1 to archive a virtually unlimited number of received fax messages indefinitely. The remote storage server 84 may also be used at the time fax messages are received. For example, if the data buffer of the fax/appliance 1 fills up while receiving a message, it may "overflow" the incoming data onto the remote server 84. This allows the fax/appliance 1 to receive an unlimited number of messages before any are viewed, and ensures that incoming data will not be lost due to a "memory full" condition.

To allow the fax/appliance 1 to overflow the incoming data onto the remote server 84, a mechanism is provided to allow the fax/appliance 1 to simultaneously maintain its connection to the transmitting fax system and to the server 84. This may be accomplished in a variety of ways. First, a single telephone line may be multiplexed between the incoming fax transmission and a modem network connection to the server. This approach may require modification of the fax or data modem protocols so that the system(s) communicating with the fax/appliance 1 do not perceive an error condition during the time the fax/appliance is using the telephone line for the network server connection. Second, the fax/appliance may be provided with two or more modem subsystems for connection to two or more separate telephone lines. This allows one telephone line to be used for receiving the fax message while another is used as the network server connection. Third, the fax/appliance 1 may employ a telephone line technology that allows data transfers under a voice (fax transmission) connection.

In addition, the fax/appliance connected to a remote storage server may provide a user interface for searching, filtering, and cataloging the collection of received fax messages stored on the server. The user interface of the fax/appliance allows the user to create and/or select a wide variety of search criteria using the reduced-keyset user interface device without having to enter large amounts of text. For example, commonly used criteria or categories may be displayed to the user as a list to select from. Other criteria may be entered as numbers, such as the date and time range of receipt of the messages, or the telephone number of the sender. As to the data to be searched, some of such data is automatically available to the fax/appliance, such as the date and time a message is received. Some information is encoded digitally in the fax transmission so that it can easily be extracted, such as the telephone number of the sender. Other desired information for searching may be extracted by having the server perform OCR (optical character recognition) on the images of each message page as they are originally stored, and saving the extracted data along with the message for use in future searches. Another type of searchable information is information provided by the user to be associated with each fax as the fax is viewed. This information could be entered directly, or selected from a pre-entered list of options, such as categories, or a nested folder storage organization. All searches could be performed using ranges or "fuzzy" matching, but these options are especially important when searching data extracted with OCR.

Figure 9:
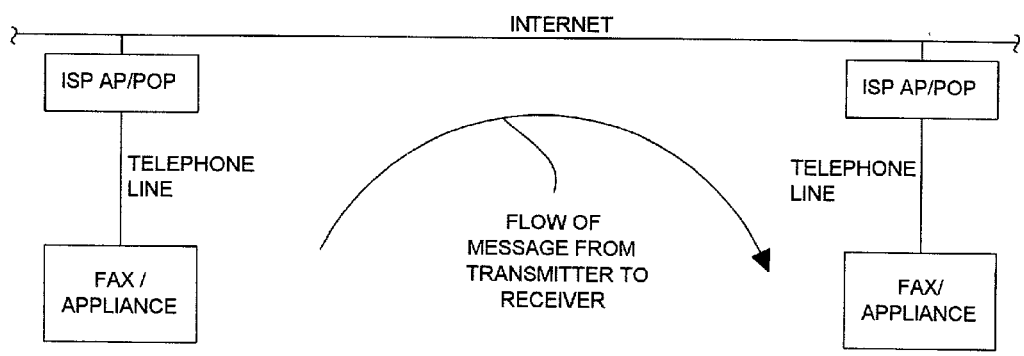
FIG. 9 illustrates a communication topology for peer-to-peer fax messaging between two fax-compatible Internet appliances via the Internet.
Figure 10:
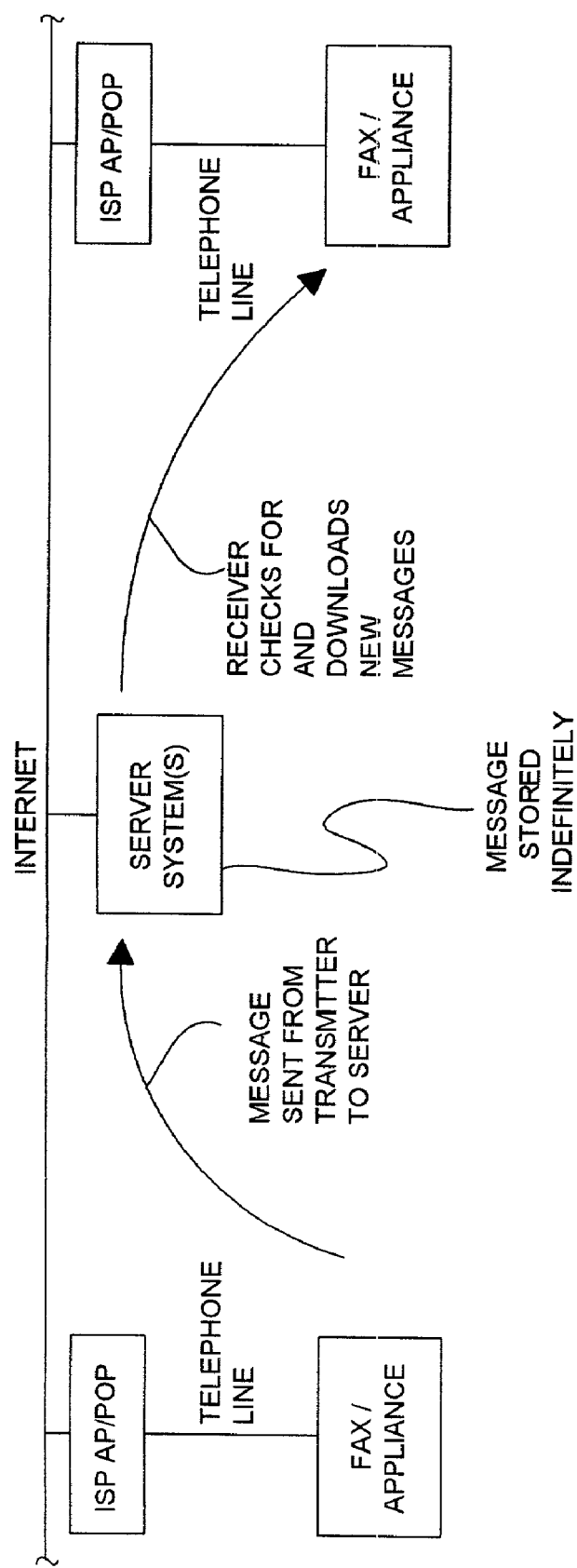
FIG. 10 illustrates a communication topology for fax messaging between two fax-compatible Internet appliances via an Internet server.

Referring to FIGS. 9 and 10, if both transmitter and receiver are fax/appliances, the transmission may be done across the Internet instead of requiring a point-to-point telephone connection.

This allows a single network connection on the appliance to be used for multiple simultaneous transactions. It also accommodates systems that have network connections other than standard telephone lines. The transmission may employ a client-to-client logical network connection, if the receiver either has a standing connection to the network or can be connected to the network on demand of an external system. If both appliances are connected to a server on the Internet, as shown in FIG. 10, the appliances may use the server to hold fax transmissions between the time one appliance transmits the messages and the time another connects to the network to receive the messages. When a communication topology including a server is used (FIG. 10), messages may be stored on the server and only downloaded to the receiver when a user is ready to view it.

A fax/appliance can communicate with various types of fax message systems (conventional fax machine, fax/appliance, etc.) that use various connection topologies (telephone connection, Internet connection, etc.) without prior knowledge of the type or connection topology of a receiving fax system. When communicating with a another fax system for the first time, the fax/appliance employs a conventional fax protocol and a point-to-point telephone connection that is supported by all fax systems. During transmission of the first fax message, each fax/appliance informs the other that it is a fax/appliance and what its unique Internet destination information is.

The fax/appliance may provide a "viewing confirmation" receipt back to the transmitting fax device. Existing fax systems typically report a successful conclusion, and terminate the telephone connection between the two communicating devices once the transmitter has sent all the data to the receiver and the receiver has stored the data in a buffer. Such a report, however, does not provide a confirmation beyond a successful transmission. In a fax/appliance, a viewing receipt may be automatically sent back to the transmitting fax system when the message is processed by the user, such as displayed on the video output, etc. In a fax/appliance shared by multiple users each having a password for access, the viewing receipt may additionally contain information about which user has viewed the fax message. Alternatively, the viewing receipt may be sent only when the desired receiving user has viewed the message. The viewing receipt may include the date/time of viewing, the telephone number associated with the viewing fax/appliance, user ID information on the viewer available to the fax/appliance, and a portion (original or scaled-down size) of the first page of the fax for identification purposes.

Several mechanisms may be used to send the return receipt message back to the sender of the viewed fax message. When the originator is a standard, conventional fax system, the receiving fax/appliance may generate a fax message containing the receipt information and send it to the originator using standard fax protocols. Alternatively, if the originating user (the human user) has an e-mail address, the fax/appliance may send a standard (SMTP) e-mail message to the user by automatically logging onto an e-mail server connected to the fax/appliance. The identity of the originating user may be extracted from the received fax by OCR, such as from the traditional to/from block at the top of the first page, and matched with e-mail addresses previously stored in the fax/appliance. If the transmitting system is also an Internet appliance, it may be configured to communicate the destination e-mail address (of the human user) for the viewing receipt to the receiving system at the time of the fax transmission. This may be accomplished by storing a list of user-e-mail addresses on the transmitting fax/appliance, and allowing the user to select an e-mail address when sending a fax message. As another alternative, when both the transmitter and receiver are fax/appliances, the transmitting appliance may send its internet IP address, hostname, or another unique identifying address to the receiving appliance. Subsequently, when the message is viewed by the user, the receiving appliance opens a TCP/IP connection to the transmitting appliance to send a viewing receipt. The fax message that is being confirmed is uniquely identified by the transmitting and receiving appliances and a portion of the image need not be sent back. The viewing receipt may be sent either at the time of viewing, or at a later time such as non-peak hours.

In addition to holding a received message to be viewed and/or forwarding it to a network storage server, a fax-compatible Internet appliance may be configured to operate as a gateway between fax messages and e-mail systems. The gateway operates in either or both directions, i.e., for receiving or transmitting faxes or both. To provide a gateway for forwarding a received fax message to an e-mail system, the fax/appliance receives the fax message normally, and then determines a destination e-mail address to which the fax should be forwarded. The forwarding email address may be determined in several ways. For example, a single destination e-mail address may be used for all incoming-faxes. If the fax/appliance services multiple incoming telephone numbers or lines, the faxes may be forwarded to a different destination e-mail address for each incoming telephone number. The fax/appliance may also determine a destination e-mail address based on the fax telephone number of the transmitting fax machine by using a lookup table. The telephone number of the transmitting fax machine may be extracted from the callerID signal or embedded information in the fax message. Further, OCR may be applied to the beginning of the fax message to identify the recipient, and then this information is used to look up a destination e-mail address.

Once a destination e-mail address is determined, the fax/appliance composes and sends a standard (text, SMTP) e-mail message. The bitmap images of each fax page may be re-encoded into a standard graphic image format (such as GIF, JPEG, or TIFF) and transmitted as attachments to the e-mail. Alternatively, OCR may be performed on the fax, and the result used to create a text message, or a text message with small embedded graphics if the fax contains graphics that will not OCR, such as could be accomplished by converting it into HTML. The composition of the outgoing e-mail message may be performed by the fax/appliance, or by a server (such as the same server the fax/appliance uses for archival storage) after the received fax message is forwarded to the server.

The fax/appliance may also operate as a gateway to convert e-mail messages into fax messages. To forward incoming e-mail to other fax machines as fax messages, the fax/appliance is configured to poll for the arrival of messages in one or more e-mail accounts on a network e mail server. New e-mail message are downloaded, and the fax/appliance determines the destination fax telephone number for each e-mail. This may be done by associating a fixed destination telephone number with each e-mail account it services, or extracting the destination telephone number from a field in the e-mail message header, or extracting the destination telephone number from the body text of the e-mail message, etc. Once the destination telephone number is determined, the fax/appliance dials the number and renders the contents of the e-mail message into fax bitmap format. For example, text contained in the e-mail message is rendered into page images using fonts and layout guidelines within the appliance.

To provide additional flexibility, a fax/appliance may be connected to or integrally formed with one or more of the I/Os and subsystems of a conventional fax machine, such as scanner subsystem, printer subsystem, and paper transport paths. Such an expanded fax/appliance system provides abilities not provided by either a conventional fax machine or a more basic fax/appliance. For example, by incorporating a printing subsystem into the basic fax/appliance, the user has the option of printing selected faxes or selected pages of faxes after viewing them, or printing multiple copies of selected faxes or pages. In addition, messages may be stored (locally or remotely), and hardcopies generated at a later time when needed. Moreover, if a fax/appliance contains a printing subsystem is also configured as an e-mail to fax gateway, it may generate hard copies of incoming e-mail messages either automatically or on demand. As another example, incorporating a scanner subsystem in a basic fax/appliance allows fax messages to be sent from paper documents. This is convenient for sending text as fax messages, because an Internet appliance does not include a text keyboard for entering text.

Even when an expanded fax/appliance system described above is used in a mode similar to a conventional fax machine, the video output and user interface features of the fax/appliance is useful for providing flexible and friendly user interface. Conventional fax machines have very limited user interface capabilities because they use minimum size and resolution displays (typically a small text LCD) with a minimal number of input keys. With the high-quality display device (e.g. TV screen), a fax/appliance provides easy-to-use user interface for functions such as maintaining a fax number database, sending multiple transmissions of a single document, etc.

Secure fax message exchange, which requires extended fax protocols but not Internet connection, can be accomplished by public-key encrypting compressed bitmap data during transmission. Several encryption schemes are known and used in document transmission, but have not been used in fax systems. In one method, if both the transmitter and receiver systems have their own pair of encryption keys (public and private), the transmitting system can encrypt the fax message using its private encryption key, so that it can only be decrypted by the use of the transmitter's public key. This type of encryption, often referred to as a digital signature, is used to verify the identity of the sender of the message. In the context of fax messages, it can be used to verify consistency in authorship of messages. With the addition of a third party (to correlate the owner/user(s) of the fax/appliance with its public key and digital certificate) the digital signature can be correlated to a specific user. The transmitting system can also encrypt the fax message using the receiver system's public encryption key. This ensures the security of the transmissions contents against interception of the telephone call.

When a fax/appliance is shared by multiple users, multiple secure "accounts" using username/password pairs or other user authentication mechanisms may be implemented so that only intended users may view the messages. One way of accomplishing this is for the receiver system to automatically send its list of users to the transmitter system after the transmitter has established a telephone connection with the receiver. The user at the transmitter end may then select one or more of the receiver's users from the list for viewing the message. The selection may occur concurrently with the transmission of the message to save telephone connection time. Also, to protect the privacy of its user list, the receiver fax/appliances may be configured to give out the user list only to "known" transmitters.

The above secure fax message exchange features are implemented as set forth in an APPENDIX attached hereto, the disclosures of which are incorporated herein by reference.

It will be apparent to those skilled in the art that various modifications and variations can be made in the fax-compatible Internet appliance of the present invention without departing from the spirit or scope of the inventions. Thus, it is intended that the present invention cover modifications and variations of this invention that come within the scope of the appended claims and their equivalents.

What is claimed is:

1. An Internet appliance for transmitting and receiving fax messages, comprising:
   a network connection section for communication with a network, the network connection device being capable of communicating using both data protocols and fax protocols;
   a video section including a video signal output connectable to a video display for outputting video signals to be displayed on the video display;
   a user interface signal receiver for receiving user interface signals generated by a reduced-keyset user interface device;
   a processing unit which controls the network connection section and the video section to generate video signals for displaying received fax messages on the video display, wherein the processing unit provides user interface functions by generating video signals for displaying information to the user and processing the user interface signals received by the user interface signal receiver in accordance with the information displayed to the user, the interface functions enabling the user to control transmission, reception and display of fax messages solely through the reduced-keyset user interface unit; and
   the processor unit is operable to store received fax messages on a server connected to the network.

2. The Internet appliance of claim 1, wherein the network connection section is operable to maintain simultaneous connection with a transmitting fax system and the server over the network, and wherein the processing unit is operable to store incoming fax messages on a server connected to the network at the time the messages are received.

3. The Internet appliance of claim 1, wherein the user interface functions include searching, filtering, and cataloging a collection of received fax message stored on the server.

4. The Internet appliance of claim 1, wherein the processing unit causes a viewing receipt to be transmitted to an originating fax system after displaying a fax message received from the originating fax system on the video display.

5. The Internet appliance of claim 1, further comprising a printing section for selectively printing stored fax messages in response to a user selection.

* * * * *